US009209711B2

(12) United States Patent
Farkas

(10) Patent No.: US 9,209,711 B2
(45) Date of Patent: Dec. 8, 2015

(54) CONTROL METHOD, CONTROL DEVICE AND MOBILE ELECTRIC POWER STORAGE APPARATUS

(71) Applicant: Gabor Farkas, Budapest (HU)

(72) Inventor: Gabor Farkas, Budapest (HU)

( * ) Notice: Subject to any disclaimer, the term of this patent is extended or adjusted under 35 U.S.C. 154(b) by 0 days.

(21) Appl. No.: 14/372,588

(22) PCT Filed: Jun. 7, 2013

(86) PCT No.: PCT/HU2013/000055
§ 371 (c)(1),
(2) Date: Jul. 16, 2014

(87) PCT Pub. No.: WO2013/182866
PCT Pub. Date: Dec. 12, 2013

(65) Prior Publication Data
US 2014/0362623 A1    Dec. 11, 2014

(30) Foreign Application Priority Data

Jun. 7, 2012    (HU) .................................... 1200343

(51) Int. Cl.
*H02M 7/539*    (2006.01)
*H02J 3/32*    (2006.01)
(Continued)

(52) U.S. Cl.
CPC ................. *H02M 7/539* (2013.01); *H02J 3/32* (2013.01); *H02J 3/386* (2013.01); *H02M 1/12* (2013.01); *Y02E 10/763* (2013.01); *Y02E 70/30* (2013.01)

(58) Field of Classification Search
CPC ............. H02M 2001/0003; H02M 2001/0012; H02M 1/12; H02M 7/539
USPC ............... 363/76, 77, 78, 79, 80, 97, 98, 127; 323/271
See application file for complete search history.

(56) References Cited

U.S. PATENT DOCUMENTS

2012/0206949 A1*   8/2012   Owen ................. H02P 21/0035
                                                          363/127
2012/0314466 A1*  12/2012   Goerges ............ H02M 7/53873
                                                          363/78

OTHER PUBLICATIONS

Amin M M et al: "Development of High-Performance Grid-Connected Wind Energy Conversion System for Optimum Utilization of Variable Speed Wind Turbines," IEEE Transactions on Sustainable Energy, IEEE, USA, vol. 2, No. 3, Jul. 1, 2011, Abstract.
(Continued)

*Primary Examiner* — Adolf Berhane
*Assistant Examiner* — Jye-June Lee
(74) *Attorney, Agent, or Firm* — Wood, Herron & Evans, LLP

(57) ABSTRACT

The invention is a control method and a control device for determining components of a control voltage of an inverter adapted for feeding power to a grid, in the course of which a vector direction ($\theta^*$) of a voltage of the grid is determined, on the basis of active power and reactive power of the grid, current reference signal components ($i_{d,ref}$, $i_{q,ref}$) are determined, Park vector components ($i_x$, $i_y$) are generated by Park transformation from components ($i_1$, $i_2$, $i_3$) associated with phases of a current of the inverter, the current reference signal components ($i_{d,ref}$, $i_{q,ref}$) are transformed into the transformed current reference signal components ($i_{x,ref}$, $i_{y,ref}$) on the basis of the vector direction ($\theta^*$), a first error signal is generated by leading the first component ($i_x$) of the Park vector and the first component ($i_{x,ref}$) of the transformed current reference signal to a first subtracting unit (77), and a second error signal is generated by leading the second component ($i_y$) of the Park vector and the second component ($i_{y,ref}$) of the transformed current reference signal to a second subtracting unit (79), the error signals are guided through control blocks each comprising three parallel signal paths (81, 83, 85) and outputting summed up outputs of the signal paths (81, 83, 85), and the components ($u_{1,inv}$, $u_{2,inv}$, $u_{3,inv}$) of the control voltage are determined on the basis of outputs ($u_{x,inv}$, $u_{y,inv}$) of the control blocks by inverse Park transformation. The invention is, furthermore, a mobile electric power storage apparatus comprising the control device.

5 Claims, 7 Drawing Sheets

(51) Int. Cl.
 H02J 3/38 (2006.01)
 H02M 1/12 (2006.01)

(56) References Cited

OTHER PUBLICATIONS

Shengwen Fan et al: "A new sensorless control strategy used in direct-drive PMSG wind power system," Power Electrnics for Distributed Generation Systems (PEDG), 2010 2nd IEEE International Symposium on, IEEE, Piscataway, NJ, USA, Jun. 16, 2010, Abstract.

Molinas M et al: "Wind farms with increased transient stability margin provided by a STATCOM," Conference Proceedings, IPEMC 2006,CES/ieee 5th International Power Electronics and Motion Control Conference, Aug. 14-16, 2006 Shanghai, China, IEEE, CES/IEEE 5th International Power Electronics and Motion Control, Aug. 14, 2006, Abstract.

European Patent Office, Notification of Transmittal of the International Search Report and the Written Opinion of the International Searching Authority, or the Declaration, May 7, 2014.

* cited by examiner

CONTROL METHOD, CONTROL DEVICE AND MOBILE ELECTRIC POWER STORAGE APPARATUS This application claims priority, under Section 371 and/or as a continuation under Section 120, to PCT Application No. PCT/HU2013/000055, filed on June 7, 2013, which claims priority to Hungary Application No. P 12 00343, filed on Jun. 7, 2012.

TECHNICAL FIELD

The invention relates to a control method and control device adapted for determining components of a control voltage of an inverter adapted for feeding power to a grid. The invention furthermore relates to a mobile electric energy storage apparatus comprising the control device.

BACKGROUND ART

There are several known approaches for controlling the inverters mentioned in the introduction. An inverter adapted for feeding power to a grid, as well as a solution corresponding to the control thereof is disclosed e.g. in US 2011/0133558 A1. This document, however, does not cover a control adapted for efficient regulation in the case of a grid voltage comprising asymmetry and/or upper harmonics.

In the light of known solutions, a need has arisen to provide a control method and control device, which enable control efficiently, simply and with the smallest possible error even in the cases mentioned above.

DESCRIPTION OF THE INVENTION

The primary object of the invention is to provide a control method and control device which are free of the disadvantages of the prior art solutions to the greatest possible extent.

The objects of the invention can be achieved by the method according to claim 1 and the device according to claim 3. Preferred embodiments of the invention are defined in the dependent claims.

BRIEF DESCRIPTION OF THE DRAWINGS

Preferred embodiments of the invention are described below by way of example with reference to the following drawings, where.

MODES FOR CARRYING OUT THE INVENTION

Figure 1:
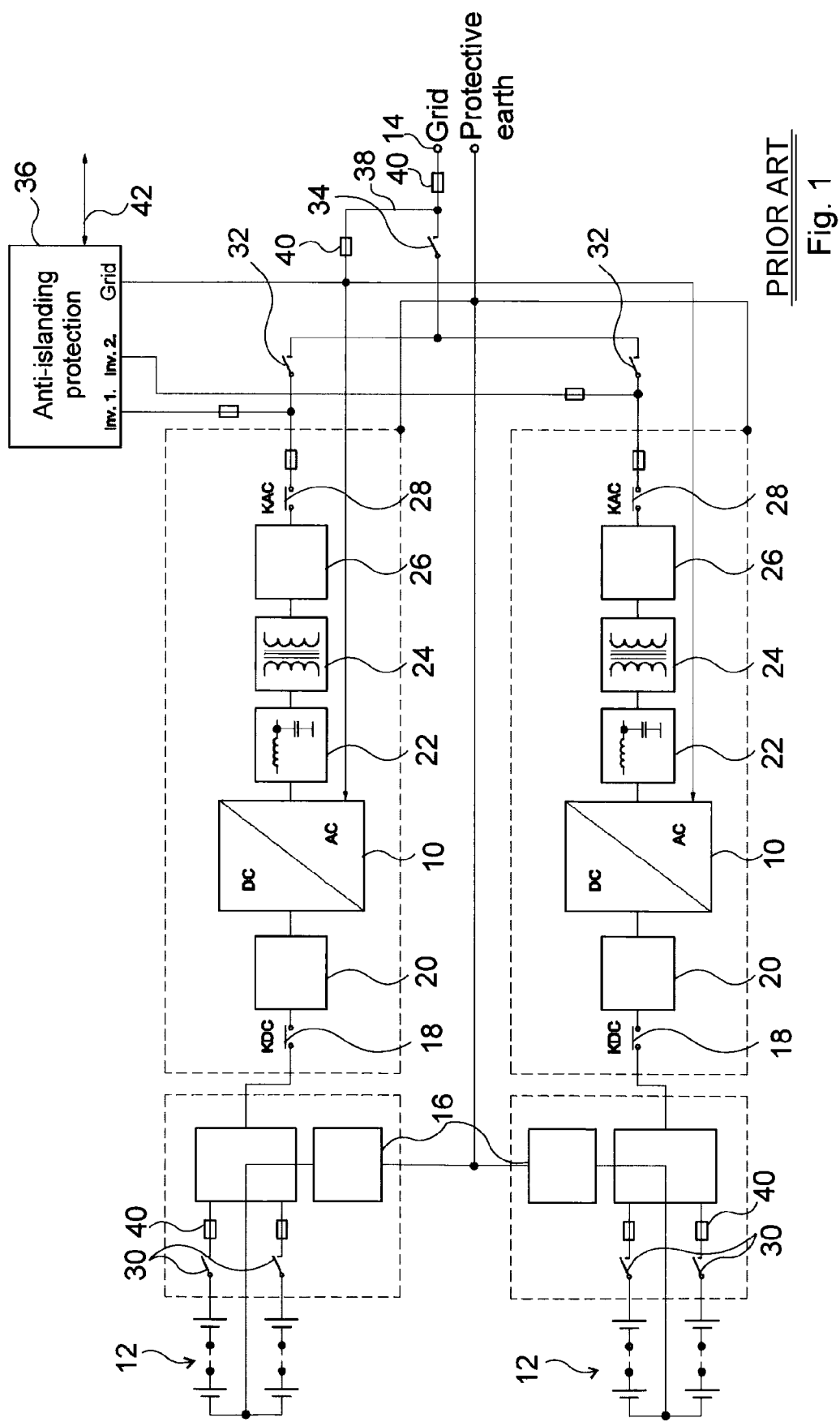
FIG. 1 is a schematic diagram of a current converter apparatus designed with an inverter comprising the current control device according to the invention.

The central unit of the apparatus shown in FIG. 1 and adapted for feeding to a grid is a bidirectional IGBT (insulated-gate bipolar transistor) type three-phase inverter 10. The inverter 10 is connected with its DC side which is characteristically a so-called DC link based on capacitors to a battery unit 12 via a DC contactor (KDC) 18 and a DC noise filter 20.

By designing the preferably container-like i.e. mobile type of apparatus, the aim was to store at least 1 MWh energy and provide 500 kW output. In the apparatus, by way of example, lithium batteries of 1000 Ah storing capacity may be used. From these batteries, for electronic and mechanical reasons, by way of example 192 pieces can be connected in series, and they make up the battery unit 12. The 192 batteries may be arranged by way of example in six blocks, with 4×8 batteries in each block. The nominal terminal voltage of the exemplary battery unit 12 is 192×3.3V, i.e. approx. 630V, and its nominal storing capacity is 630 kWh. This unit is connected by way of example through a 250 kW inverter 10 to a grid 14. When two such battery units 12 are applied, a storing capacity of approx. 1.2 MWh and an inverter output power of 500 kW are obtained. In the apparatus shown in FIG. 1, each inverter 10 handles (charges and discharges) the associated battery unit 12. Accordingly, it is not necessary to connect the two battery units 12 in parallel, and both units may operate independently if so desired.

The inverter 10 with its three-phase PWM (pulse width modulation) interface (characteristically having a modulation of 5 kHz) is connected through a three-phase sine wave filter 22 to the primary side of an isolating transformer 24. The secondary side of the transformer 24 is connected to the grid 14 through a grid disturbance filter 26, an AC contactor (KAC) 28 and semiconductor fuses 40.

FIG. 1 shows that fuses 40 are used in other points of the apparatus also: at the input of each block of the battery unit 12, directly at the connection point to the grid 14 and on the wiring leading from the grid 14 to the blocks comprising one inverter 10 each. Each block can be isolated from the grid 14 by means of switches 32. Each block of the battery unit 12 can be isolated from each block of the apparatus by means of switches 30. The two blocks of the apparatus can be isolated jointly from the grid 14 by means of a switch 34. Connected to an earth wire, a ground fault protection 16 is connected to a measuring unit of the battery 12.

A unit 36 responsible for avoiding isolated operation is also connected to the apparatus, and the operation of the said unit can be supervised through a wiring 42. The unit 36 is connected to each block of the apparatus and to the grid 14 through fuses 40. The unit 36 responsible for avoiding isolated operation makes sure that if it is not necessary to feed power to the grid 14 (for example the relevant grid is out of operation), then the given block of the apparatus should not feed power to the grid 14. Through the wiring 42, in such cases it issues a command to the supervision to isolate the apparatus. The external supervision is connected to the apparatus e.g. through an optical cable, on the so-called MODBUS protocol (http://en.wikipedia.org/wiki/Modbus). For safety reasons, the apparatus has back-up protection, in case there is a disruption in the series communication (relay-based outputs and inputs).

In the apparatus shown in FIG. 1, the primary function of the inverter 10 is bidirectional galvanic isolated power transfer, e.g. between the 400V 50 Hz low voltage grid 14 and the battery unit 12. This galvanic isolation set-up enables the connecting of an arbitrary number of blocks in parallel to the grid 14, FIG. 1 shows the connection of two blocks. In addition to the primary function, the inverter 10 is able to support reactive power management of the grid, provided that the control method and the control device according to the invention is used.

The power control of the inverter 10 is disclosed in the following. It can be seen in the arrangement of FIG. 3 that from the active power and reactive power reference signals—in FIG. 3, $P_{ref}$ and $Q_{ref}$ respectively—once the measured rate of the grid voltage is known—input $U_{ampl}$—the reference signal component $i_{d,ref}$ associated with the active current and the reference signal component $i_{q,ref}$ associated with the reactive current are calculated. These current reference signal components are also used in the embodiment of the invention shown in FIG. 4.

Figure 3:
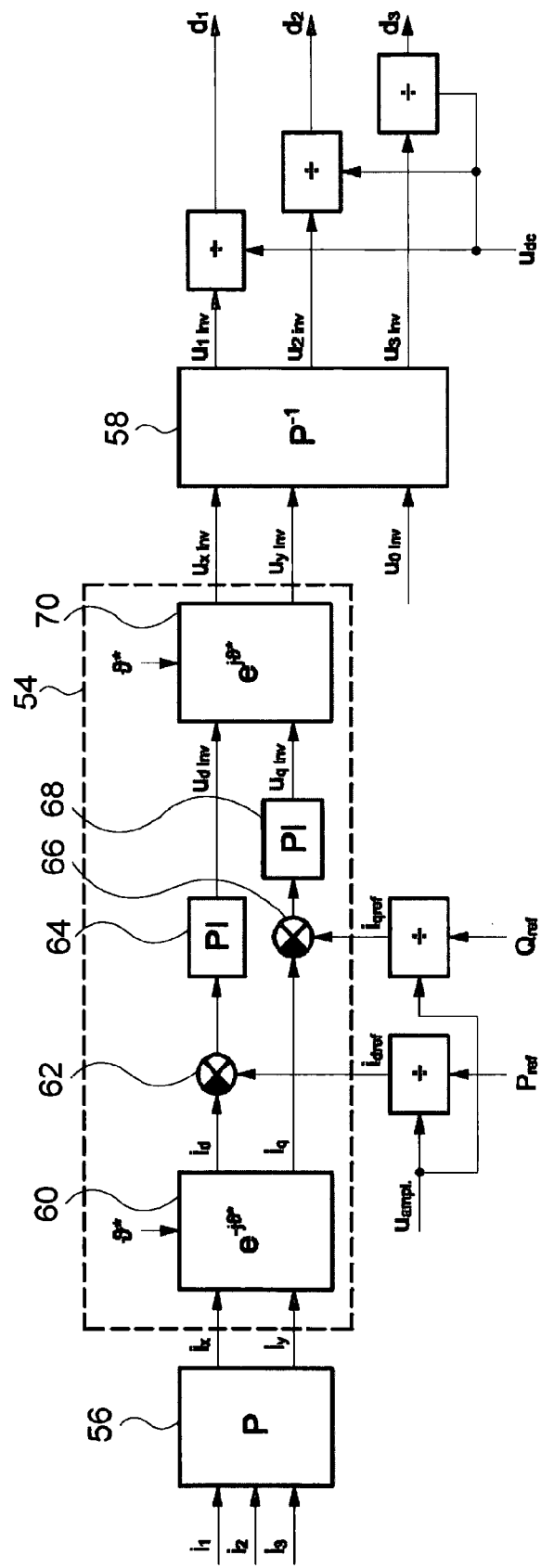
FIG. 3 is a block diagram describing a known control method.

The function of a current control device 54 shown in FIG. 3 is to make sure in the knowledge of the currents $i_1$, $i_2$, $i_3$ measured on the inverter output in each of the phases that the measured currents $i_1$, $i_2$, $i_3$ and the current reference signal determined by the components $i_{d,ref}$ and $i_{q,ref}$ are equal. The current measured on the output of the inverter is returned to the control device so as to enable feedback. As shown later on, the output of the control device is provided by the voltages to be generated by the inverter, and hence feedback takes place by the determination of these voltages, followed by re-feeding the current rates into the control device. Because the components of the measured current and the components of the current reference signal are specified in different coordinate systems, it is necessary to transform them into the same coordinate system for comparison, as depicted in the case of the current controllers of FIGS. 3 and 4.

In accordance with FIG. 1, the three-phase output of the inverter 10 is connected through the sine wave filter 22 to the preferably delta winding of a characteristically 50 Hz transformer 24. Thanks to the configuration of the apparatus, so-called zero sequence currents cannot flow—except in the case of a multiple source ground fault. It is also a consequence of this circuitry—because the sum of the three currents has nowhere to flow—that the phase currents $i_1$, $i_2$, $i_3$ of the inverter 10 are not independent of each other, and therefore they cannot be controlled by three independent current controllers. Therefore, in known solutions, a control in the d-q coordinate system is applied; such a case is illustrated in FIG. 3.

A known control method of grid-connected three-phase voltage inverters is control in a coordinate system connected to the vector direction of grid voltage. In the coordinate system of the grid voltage, the parameters of the grid voltage, i.e. its frequency $\omega^*$ and vector direction $\theta^*$ are identified in filtered manner, preferably in accordance with FIG. 2, using a phase locked loop. On the basis of FIG. 2, the components $u_1$, $u_2$, $u_3$ of the grid voltage are subjected to Park transformation in a known way by means of a unit 44, and hence components $u_x$ and $u_y$ of the Park vector associated with the measured voltage are obtained.

From the sampled actual values—e.g. from the actual values of the grid voltage—a Park vector is generated according to the following. Two elements of the Park vector can be assumed to be the real and imaginary components of a complex number:

$u_x + ju_y = \frac{2}{3}(u_1 + a^* u_2 + a^{2*} u_3)$, where $$a = e^{j*\frac{2\pi}{3}}.$$

When the components are written separately, the following is obtained $u_x = \frac{2}{3}(u_1 - \frac{1}{2}*u_2 - \frac{1}{2}*u_3)$, and $$u_y = \frac{2}{3}\left(\frac{\sqrt{3}}{2}*u_2 - \frac{\sqrt{3}}{2}*u_3\right),$$

respectively. By tracking the angle with a phase locked loop (PLL), the noise-free estimated $\theta^*$ angle of the grid voltage is obtained.

When the components $u_x$ and $u_y$ of the Park vector are transformed into a polar coordinate system by a unit 46, amplitude $u_{ampl}$ and phase a of the grid voltage actual value can be obtained. Phase $\theta$ is supplied to a subtracting unit 52, which forms a part of a phase locked loop. On the basis of FIG. 2, the phase locked loop comprises a PI (proportional-integral) unit 48, on the output of which a frequency $\omega^*$ appears. The output of the unit 48 is connected to an integrating unit 50, and at the output thereof a vector direction $\theta^*$ appears. This is returned to the subtracting unit 52, and accordingly the vector direction $\theta^*$ emitted by the phase locked loop approaches the phase of the grid voltage, and $\omega^*$ approaches its frequency. The value of $\theta^*$ is practically an estimated noise-free angle of the grid voltage vector. As shown by FIG. 3, the vector direction $\theta^*$ is the input of units 60 and 70.

According to FIG. 3, the control of the inverter output voltage is carried out by the known current control device described below. The phase currents $i_1$, $i_2$, and $i_3$ measured on the AC side output of the inverter are transformed into an orthogonal system, i.e. a Park vector is generated by a unit 56. Vector components are $i_x$ and $i_y$ in accordance with FIG. 3. Next, by making use of the vector direction $\theta^*$ associated with the grid voltage and determined by the phase locked loop, the vector is transformed into the coordinate system of the grid voltage by means of a unit 60. Accordingly, from the components $i_x$ and $i_y$, the components $i_d$ and $i_q$ are obtained, and these are already the values corresponding to the coordinate system of the grid voltage, and therefore they can be compared with the current reference signal components $i_{d,ref}$ and $i_{q,ref}$ obtained as described above.

The current control is carried out according to FIG. 3 for the components $i_d$ and $i_q$ by means of PI (proportional-integral) control units 64 and 68. Through a subtracting unit 62, the input of the control unit 64 receives the difference between the component $i_{d,ref}$ of the current reference signal determined from the active power and the component $i_d$. Similarly, through a subtracting unit 66, the input of the control unit 68 receives the difference between the component $i_{q,ref}$ of the current reference signal determined from the reactive power and the component $i_q$. On the basis of the feedback, the current control device 54 is trying to minimise these differences, i.e. it can be achieved by means of this control that the components of the current forced on the grid approach the current reference signal components calculated from the active and reactive power. Accordingly, the voltage values $u_{d,inv}$ and $u_{q,inv}$ to be adjusted by the inverter appear on the output of the units 64 and 68. The voltage values $u_{d,inv}$ and $u_{q,inv}$ to be adjusted are rotated by means of a unit 70—making use of the vector direction $\theta^*$ fed as an input also to the unit 60—into a stationary coordinate system, i.e. to a coordinate system corresponding to the Park vector components generated by the unit 56. By changing the coordinate system, from the voltage components $u_{d,inv}$ and $u_{q,inv}$, the components $u_{x,inv}$ and $u_{y,inv}$ are obtained in a stationary coordinate system according to the discussion above. Next, the value of the zero sequence component $u_{0,inv}$ shall be selected, e.g. through the application of the so-called flat-top or space vector modulation [e.g. Attila Balogh, István Varjasi: Control of photoelectric converters, ELEKTROTECHNIKA 99: pp. 24-26. (2006), http://mycite.omikk.bme.hu/doc/4000.doc]. For the components $u_{x,inv}$, $u_{y,inv}$, $u_{0,inv}$ an inverse Park transformation is carried out by means of a unit 58, to determine each voltage component $u_{1,inv}$, $u_{2,inv}$, $u_{3,inv}$ in a coordinate system corresponding to the grid. It is necessary to generate these components $u_{1,inv}$, $u_{2,inv}$, $u_{3,inv}$ at the output of the inverter to make sure that the inverter provides feedback to the grid with appropriate current values by a voltage based control. Accordingly, on the basis of the components $u_{1,inv}$, $u_{2,inv}$, and $u_{3,inv}$ as well as a voltage level $u_{dc}$ available to the inverter—which level is characteristically identical with the voltage of the battery unit—the duty cycles $d_1$, $d_2$, $d_3$ to be applied in the inverter semiconductor units associated with each current phase are calculated. By means of the semiconductor units, the voltage-time functions necessary for feedback are generated, and the duty cycle values are converted by a pulse width modulator (PWM) into logic signals suitable for the direct control of the IGBT. These voltage-time functions are preferably supplied according to FIG. 1 to a sine wave filter, which isolates the high frequency components.

The known control method presented on the basis of FIG. 3 in an ideal case i.e. in a case of a grid voltage consisting of symmetric and purely basic harmonics and an ideal actuator (i.e. if in an apparatus—shown e.g. in FIG. 1—comprising the inverter, the non-linearity of the magnetic units and the switching delay of the applied semiconductors can be neglected) ensures the faultless pursuing of the reference signal in the steady state of the feeding to the grid. If, however, the grid voltage comprises an asymmetry and/or harmonics, the grid current will also be burdened by asymmetry and/or harmonics. The current control device according to the invention is adapted for reducing these additional effects, and an embodiment is presented with the help of FIG. 4.

The so-called resonant current controllers have been developed for the controlling of single phase converters, but they are also applied for such three-phase topologies, where the currents of the three inverter phases are independent (by way of example the so-called 3F+N topology) or partly independent (typically in the case of three-level inverters, in topologies without transformer isolation).

For a three-phase topology which prevents the occurrence of a zero sequence current, the known resonant current controllers cannot be applied directly. For a transformer isolated inverter connected to energy storing units—battery units—shown in FIG. 1, the sum of current components associated with the three inverter phases is zero even in the immediate value, i.e. the current components are not independent from each other. The novelty of the control method and control device according to the invention is in that the method of resonant control is not applied directly for phase currents, but it is extended to the regulation of three-phase vector—Park vector—components.

Figure 4:
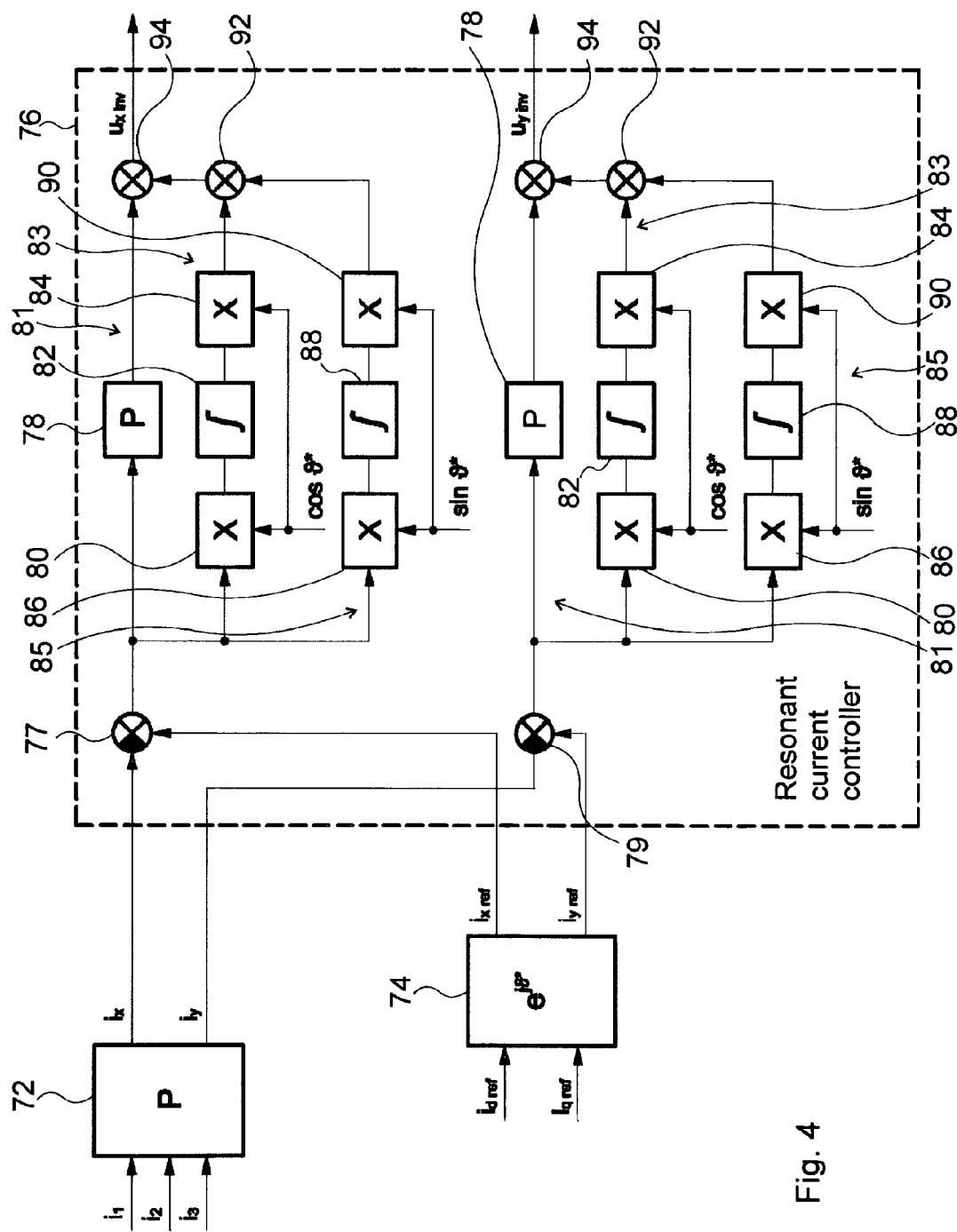
FIG. 4 is a block diagram illustrating an embodiment of the control method and control device according to the invention.

In FIG. 4 an embodiment of the current control device according to the invention is shown. The part compassed round by a dotted line in FIG. 4 is a current control device 76. The current control device 76 has similar inputs than the known current control device 54 (instead of $i_{d,ref}$ and $i_{q,ref}$ it uses the values $i_{x,ref}$ and $i_{y,ref}$ transformed into a stationary coordinate system), and similarly to the current control device 54, it is adapted for determining the voltage components $u_{x,inv}$ and $u_{y,inv}$, making them available on its output, but it performs the control differently from and much more efficiently than the known current control device 54.

In the embodiment of FIG. 4, Park vector components $i_x$ and $i_y$ are generated by means of a unit 72 from phase currents $i_1$, $i_2$ and $i_3$. In addition, a so-called n component, i.e. a zero sequence component is also defined. The zero sequence component is of course zero in the case of the main circuit topology applied for the current control device according to the invention, and therefore it is not necessary to deal with its control, and at the most it can be used for a protective function (ground fault monitoring) only. Accordingly, the current control device 76 is applied for the Park vector components x and y. The current control device 76—similarly to the current control device 54 applying the d-q coordinate system quantities—comprises proportional-integral units, but in a topology substantially deviating from the current control device 54. In the current control device according to the invention, the integrator is practically divided into two, depending on whether a sine or cosine correcting variable is needed in relation with the grid synchronisation signal.

Figure 2:
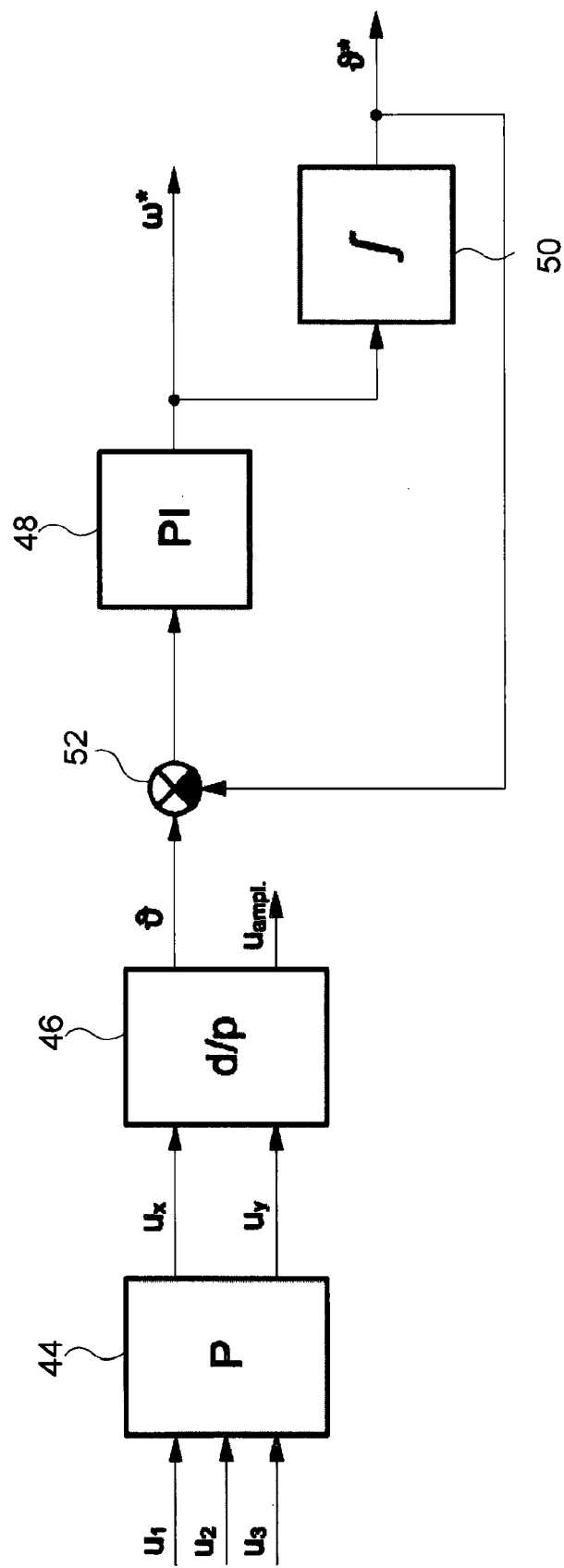
FIG. 2 is a block diagram illustrating the identification of the direction of the grid voltage vector.

In harmony with the discussion above, the method according to the invention is implemented according to the following, using the markings of FIGS. 3 and 4. First, vector direction $\theta^*$ of a voltage of the grid is identified, e.g. as shown in FIG. 2. Next, on the basis of active power ($P_{ref}$) and reactive power ($Q_{ref}$) of the grid, current reference signal components ($i_{d,ref}$, $i_{q,ref}$) are determined, and from the components ($i_1$, $i_2$, $i_3$) of inverter phase currents, Park vector components ($i_x$, $i_y$) are generated by Park transformation. By the method according to the invention, furthermore, the current reference signal components ($i_{d,ref}$, $i_{q,ref}$) are transformed on the basis of the vector direction $\theta^*$ into transformed current reference signal components ($i_{x,ref}$, $i_{y,ref}$). Next, a first error signal is generated by leading the first component ($i_x$) of the Park vector and the first component ($i_{x,ref}$) of the transformed current reference signal to a first subtracting unit 77, and a second error signal is generated by leading the second component ($i_y$) of the Park vector and the second component ($i_{y,ref}$) of the transformed current reference signal to a second subtracting unit 79. The error signals are guided through control blocks each comprising three parallel signal paths 81, 83, 85 and outputting summed up outputs of the signal paths 81, 83, 85. It is shown in FIG. 4, that out of the signal paths 81, 83 and 85, the error signal is guided through a proportional controller 78 in the signal path 81, and in the signal path 83 the error signal is guided through a first unit 80 multiplying with cos $\theta^*$, through an integrating unit 82 and then through a second unit 84 which also multiplies with cos $\theta^*$. In the signal path 85, the error signal is guided through similarly to the signal path 83, i.e. in the signal path 85 through a first unit 86 multiplying the error signal with sin $\theta^*$, through an integrating unit 88 and through a second unit 90 which multiplies with sin $\theta^*$. Furthermore, by the method according to the invention, on the basis of the control block outputs ($u_{x,inv}$, $u_{y,inv}$) which come from summing units 92 and 94, the control voltage components ($u_{1,inv}$, $u_{2,inv}$, $u_{3,inv}$) are determined by inverse Park transformation.

Accordingly, the current control device 76 deviates from the current control device 54 in the method of calculating the components $u_{x,inv}$, $u_{y,inv}$ of an correcting signal generated by the inverter on the basis of the components $i_x$, $i_y$ in a coordinate system called also orthogonal. With sub-units demonstrated through the description of the method according to the invention, the control device shown in FIG. 4 operates extremely advantageously as discussed below.

In line with the control having three signal paths and comprising proportional and integrating controllers, the components $u_{x,inv}$, $u_{y,inv}$ approach and converge to the appropriate values during the control method. Proper convergence is facilitated by the multiplications with cos θ* and sin θ* applied in each signal path, because the time-dependence of grid voltage vector direction appears in cos θ* and sin θ*. The θ* usually changes slow with time.

Thanks to the feedback, the outputs of each signal path converge to the cosine and sine member of the component ($u_{x,inv}$ or $u_{y,inv}$) intended to be generated, while the error signal decreases. By the reduction of the error signal, smaller and smaller signal—i.e. which converges to zero—emerges on the output of the signal path 81, due to the proportional control. On the contrary, the integrating units 82 and 88 in the signal paths 83 and 85 behave according to the following. The more the error signal coming from the output of the subtracting unit 77 converges to zero, the more it is true that even when multiplying with cos θ* or sin θ*, a signal converging to zero is obtained on the input of the integrating units 82 and 88. If the input of the integrating units 82, 88 is zero with a good approximation, then their output does not change compared to the value settled for earlier. Therefore, with the error signal decreasing, the output of the integrating units 82, 88 is becoming steadier. The signals appearing on these outputs are multiplied with cos θ* and sin θ* in the signal paths 83 and 85. When the constant values provided by the integrating units 82, 88 are multiplied with cos θ* and sin θ*, practically a constant correcting signal is obtained, because by summing up the signals of the three signal paths 81, 83, 85 and with approaching the error signal to zero, the signal path 81 provides a smaller addition. In the steady state, when the output of the signal path 81 is zero, the time dependence of the correcting signal is carried by cos θ* and sin θ*, and the associated amplitudes are the outputs of the integrating units 82, 88. The two integrating units used for each $u_{x,inv}$, $u_{y,inv}$ component enable according to the discussion above that in a steady state the grid current follows the reference signal faultlessly even in the case of a grid voltage asymmetry. Double multiplication with cos θ* and sin θ* is advantageous, because as a result of the slow change, this can be practically transferred in front of the integral created by the integrating unit, and in an ideal case therefore the same constant multiplier of the sum of $\cos^2$ θ* and $\sin^2$ θ*—being equal to one—is essentially obtained in the two signal paths. Of course, this condition is not always met due to the time dependence of θ*, but this approximation can be well-applied even in a non-ideal case.

In association with the apparatus adapted for feeding to a grid, because of the deviations occurring e.g. as a result of the non-linearity of magnetic elements or the switching delay of semi-conductors, harmonics arise, which can be preferably compensated on the basis of the discussion below, in accordance with an embodiment of the device and method according to the invention.

By changing the arrangement of FIG. 4, the harmonics can be eliminated as follows. To eliminate the harmonics, such control blocks are to be fitted between each subtracting unit and the output values ($u_{x,inv}$ or $u_{y,inv}$) in the relevant signal paths of which multiplications with cos(nθ*) and sin(nθ*) are carried out, where n is the order of harmonics intended to be compensated. Because the arrangement is characterised by a sixfold symmetry (three phases and mirror symmetry), the m+/−1 harmonics are characteristic, where m=6, 12, 18 . . . according to the symmetry.

In this way, it is advisable to perform a compensation, i.e. to integrate the appropriate control blocks for at least the $5^{th}$, $7^{th}$, $11^{th}$ and $13^{th}$ harmonics, because they play a crucial role due to the symmetry.

At the mains frequency transformers power level detailed in association with FIG. 1, some percent of the nominal current is the magnetising current. This also means that even a DC component of a few tens of a percent led through the transformer coils may substantially magnetise the transformer. Since the transformer current is controlled, this DC component will be roughly identical with the offset error of the current sensor. In the complete temperature range, this detection error causes unacceptably high magnetisation. The error of a general purpose Hall effect current sensor may even reach 1% of the measuring range. Because the upper limit of the measuring range is typically much higher than the nominal current (because of the deviation of peak/effective value and due to the measurability of dynamic overshot), therefore, if the magnetising current is 4% of the nominal current (a transformer characteristic of more than 100 kW), this may even represent a 50% offset in the flux, and therefore the converter will be unsuitable for use.

To tackle the problem of magnetisation, basically two methods are broadly used in the industry. According to one, the inaccuracy of measuring the current is simply reduced by the integration of a precision low offset current sensor (fluxgate technology). These current sensors entail a substantial extra cost. The other solution is a shunt resistance based precision current measurement. Since the integration of the shunt in the circuit causes an additional loss, typically the resistance of the transformer primary coil is used as a shunt resistor. In this case, in addition to the mV magnitude DC component to be measured, there is a several hundred volt 50 Hz basic harmonics, but they can be removed from the measured signal by a multistage low-pass filter containing the appropriately precise operational amplifiers. Since the DC component may occur theoretically also on the secondary side, this measurement is to be done on both sides.

Figure 5:
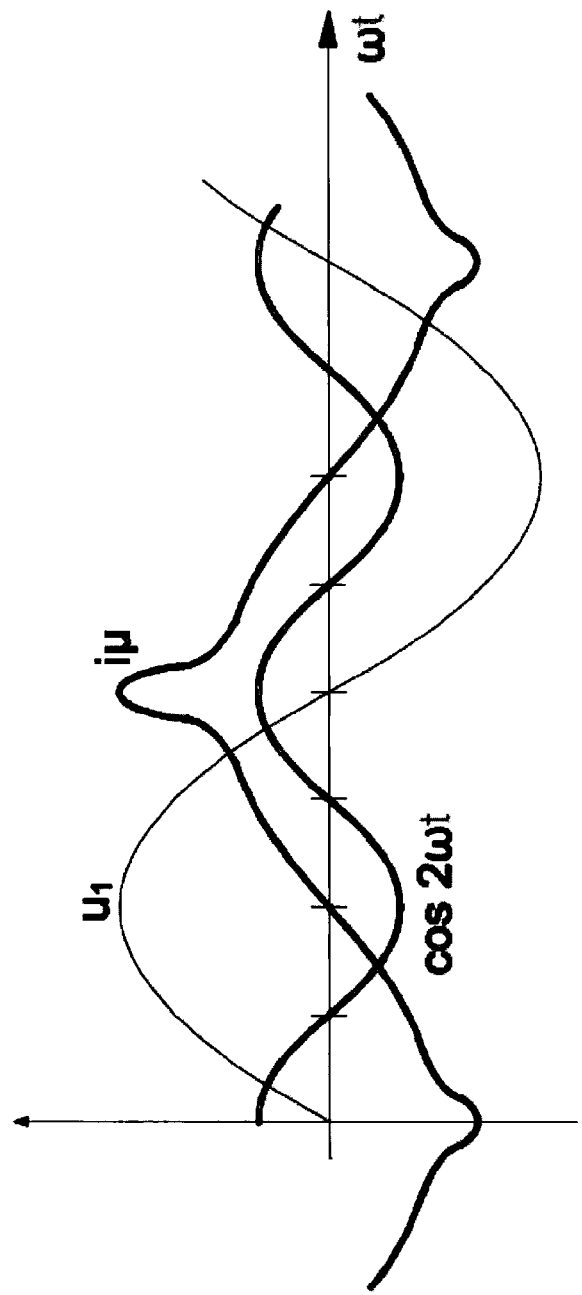
FIG. 5 is a diagram showing the phenomenon of magnetisation.

The time range conditions characterising the magnetisation of the transformer can be followed on the basis of the graph of FIG. 5. The magnetising current $i_\mu$ of the transformer is not a sine current even when free of magnetisation offset, and shows a heavy distortion compared to a sine wave signal especially in the region of the zero transitions of the coil voltage $u_1$ (where a maximum induction arises in the iron). The extent of deviation from the sine wave signal becomes asymmetric as a result of magnetisation offset caused by the DC current component. This asymmetry can be well-demonstrated by determining the 2nd harmonic of the magnetising current $i_\mu$. In accordance with FIG. 5, the magnetisation took place in a positive direction and therefore after the positive half-wave of the coil voltage $u_1$, an asymmetric increase of the magnetising current $i_\mu$ can be seen. Since in the apparatus adapted for feeding to a grid and shown in FIG. 1, current measurement is carried out on both sides of the transformer 24, thanks to the configuration of the apparatus shown in FIG. 1, the magnetising current $i_\mu$ can be determined in a known way, in addition to—independent of the offset of the applied current sensor—a reasonably accurate identification of its second harmonic (which is the component cos(2ωt) in FIG. 5) is possible, on the basis of which the DC component can be eliminated. The magnetising current can be calculated according to a value reduced to the primary, e.g. for phase 1, $$i_{1\mu P} = i_{1P} - \frac{N_S}{N_P} i_{1S}.$$

In a typical compensation based current sensor (e.g. the LA series sensors of the LEM manufacturing company), the linearity error is approximately one range of order lower than the DC measuring error, and therefore the 2nd harmonic of the current can be determined by approx. one magnitude more accurately than the value of the DC component. The DC component is eliminated according to the following. The magnetising current $i_\mu$ is averaged out by multiplying with $\cos(2\omega t)$ and from the result of the averaging a conclusion can be drawn about the value of the DC component. In the case corresponding to FIG. 5, where the saturation occurs at the negative zero transition of phase voltage, the average value of the multiplication of the magnetising current calculated according to the discussion above and the function $\cos(2\omega t)$ will be positive. The generating of the average value is executed by a high time constant (in the range of seconds) low pass filter. The average value obtained for each phase is Park transformed. By this DC component, the components $u_{x,inv}$ and $u_{y,inv}$ obtained by the control method or even the current components $i_1$, $i_2$, $i_3$ obtained after the feedback can be corrected. Because from the aspect of the DC component the proportional resonant controller behaves as a proportional member, the two approaches are identical from a theoretical aspect. During the implementation, the compensation values modifying the components $u_{x,inv}$ and $u_{y,inv}$ are obtained by multiplying with a negative value proportional factor, proportionally with the Park transformed average values.

A special advantage of this method is that it eliminates the magnetisation offset of the transformer even in the case when the DC component is not generated by the apparatus, but the DC component arises on the grid side—e.g. due to the asymmetric operation of a high power rectifier.

Figure 6:
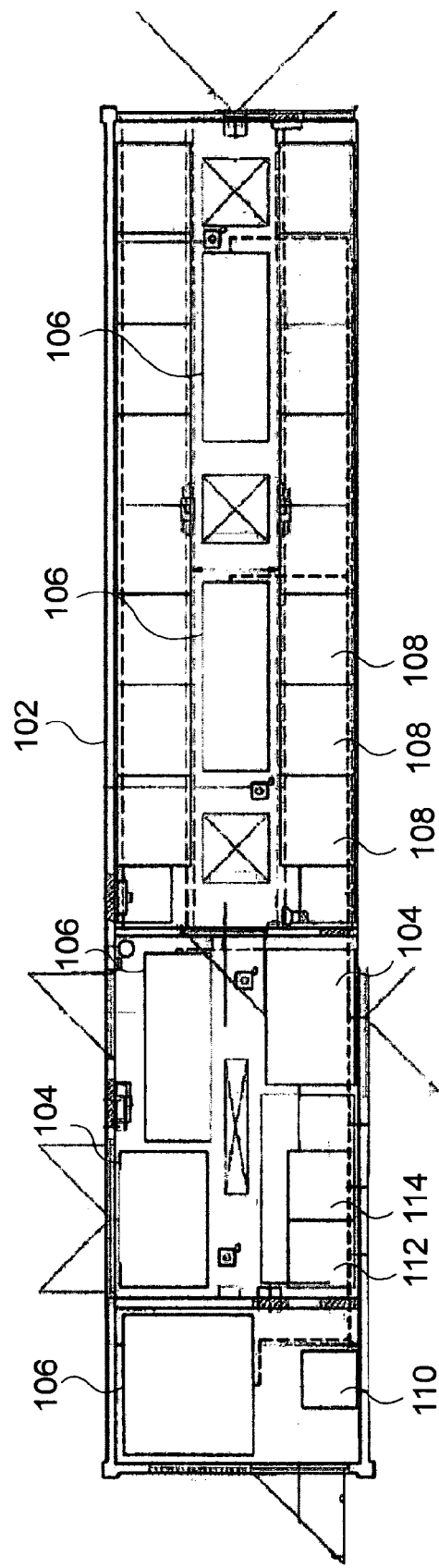
FIG. 6 is a diagram illustrating a mobile power storage apparatus applying the control method and control device according to the invention.

FIG. 6 is the schematic diagram of a high output, long-life, mobile, Li-ion battery electric power storage apparatus. The apparatus is adapted for repeatedly storing and supplying a high volume of electric power, it is portable, and may become an integral part of a smart grid as a scalable energy store that can be installed at any point of the grid. The following advantages may stem from its application:

Strengthening of distribution network because of the difficult to plan electricity producers and consumers Strengthening of transmission network because of the difficult to plan electricity producers and consumers After a major outage, it serves as an electricity production unit which enables the re-starting of the system Optimising of the energy costs Shifting the introduction of renewable energy in time in order to reduce the deviations from the schedule and/or for the purpose of price speculation Enabling the shifting of grid developments (transmission, distribution) in time Enabling the shifting of grid developments (transmission, distribution) for the grid operator and the consumer Production equalization: 'smoothing' of a production fluctuation which stems from short periods of primary renewable energy changes Controlled units in order to improve the servicing ability (retail consumers) and the utilisation rate of the transmission grid Providing standby capacity for control purposes Enhancing the reliability and improving the quality for large consumers Enhancing the reliability for retail consumers Influencing the steepness of control slope Energy source for substation consumption Mitigating of transmission bottleneck Supporting of voltage/reactive power control through reactive power production/consumption Providing a standby energy source for small companies requiring high availability (e.g. server farms)

Providing a standby energy source for larger companies requiring high availability (e.g. aluminium processing, car manufacturing)

Energy arbitrage—trade price calculation.

The apparatus is a mobile apparatus with an individual assembly for the storage and removal of 1 MWh electric energy many thousand times. From a flat state, full charging and from a charged state full discharge can take place in 2 hours to the three-phase 0.4 kV grid by means of two bidirectional inverters (output: 250 kW each) according to the invention. Preferably, the inverters are arranged in a cage enabling access from the two sides and therefore simple control and if necessary servicing. The 384 LiYFePO4 batteries of 1000 Ah capacity each in the apparatus are managed by a BMS (battery management system) unit, which is able to examine the charging level of the batteries and to equalise the charge simultaneously.

The realization shown in FIG. 6 is implemented in a container 102, and therefore it can be installed in any place and transported on rolling wheels. This application resolves the dilemma of fixed installation, fixed output, high investment storages like for example a pumped storage hydroelectric power plant or a compressed air energy storage. The apparatus is modular, and can be implemented in arbitrary sizes by assembling its basic components, i.e. the batteries, as needed.

The apparatus comprises a bidirectional 250 kW inverter 104. The primary function of it is a bidirectional galvanic isolated energy transfer between the 400V 50 Hz low voltage distribution grid and the Li-ion battery. Thanks to the implemented circuit approach, modules of an arbitrary number and output can be connected in parallel to the grid. In addition to the primary function, the inverter is also able to support the reactive power management of the grid. As a result of its bidirectional design, the inverter 104 is able to operate both as a DC/AC inverter and as an AC/DC charger.

The modes of operation of the inverter 104 are the following:

Switched off status: the magnetic switch between the converter circuitry and the grid and between the converter circuitry and the battery is open.

Standby status: the magnetic switch between the converter circuitry and the grid and between the converter circuitry and the battery is closed, and the inverter is capable of being actuated automatically within 1 msec after receiving an external command or acting upon a specified event.

Operating status: the inverter follows the active power and reactive power reference signal received from the supervising system.

The inverter 104 receives the active power and reactive power reference signal 25 from the supervising system. Depending on the sign, this could mean the charging of the battery (active rectifier mode) or feeding to the grid. In the case of both modes of operation, the inverter uses the grid with a sine current.

The advantage of this embodiment is that the reference signal received from the supervising system may be overridden by the controller, if a grid voltage dependent change in the reactive power is allowed, and a voltage drop is experienced, or if the execution of the reactive power command would result in an excessive phase voltage increase. If the active and reactive power reference signal cannot be provided due to the current limitation of the inverter, preferably reactive power has a higher priority.

The applied current controllers are resonant controllers operating in the x-y coordinate system, the advantage of which—contrary to the conventional regulation in a d-q coordinate system according to the discussion above—is that it is able to implement accurate current control even with an asymmetric grid voltage.

The protection of the apparatus is provided by integrated protection facilities, for example in the case of overcurrent, overvoltage or high temperature, but the apparatus also has redundant protection facilities to compare the measured and calculated voltage, current and power data. It is a further advantage that the implemented regulation comprises also the protection functions designed for the components of a low voltage grid, and specified for the micro power plants feeding a low voltage grid, such as the appropriate nature of voltage and frequency, protection against the changing of frequency, remote short circuit protection, as well as the handling of short and long period voltage decreases.

The container 102 furthermore air conditioning units 106, battery racks 108, a storing cabinet 110 for safety and health at work and reliable operation, a control cabinet 112 and a AC distributor cabinet 114 are arranged.

Figure 8:
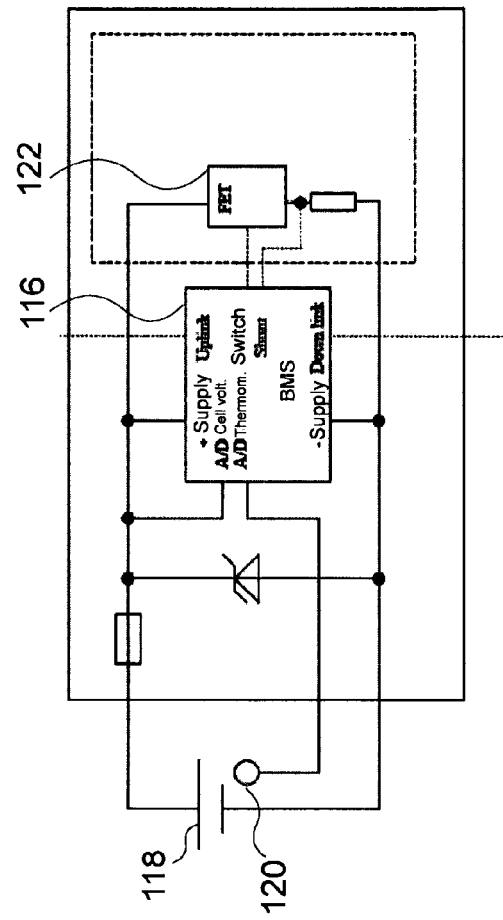
FIG. 8 is a schematic circuit diagram showing sub-units of one block of FIG. 7.
Figure 7:
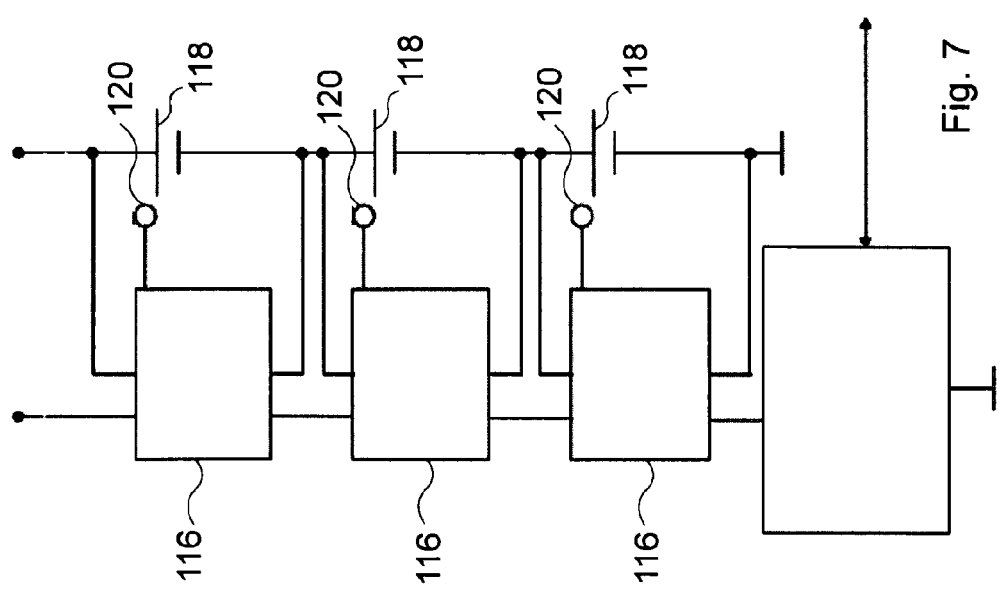
FIG. 7 is a diagram showing an exemplary implementation of one detail of a battery unit applied by way of example in the apparatus of FIG. 6.

In the preferred embodiment shown in FIG. 6 and according to the invention, the BMS circuitry described in FIGS. 7 and 8 are shown. The BMS is an indispensable element of the Li-ion battery systems. The BMS system allows the adjustment of the voltage levels of the cells, prevents the dropping of the cell voltage below a certain level or its rising above a certain level, regulates the charging current and the discharging current and protects the cells from heating up. The minimal equaliser current of the BMS is by way of example 10A, the standby current is <100 µA, it has an optical front-end, the topology is locally distributed, the heat is dissipated to the battery, and the highest number of cells that can be handled is by way of example 65534.

In the embodiment depicted, out of the microcontrollers of BMS module 116, the communication is guided through a level shifter, and therefore in the case of an eventual wire breakage between the cells it protects the circuits from a meltdown. This could occur because in the case of a cable breakage or contact error, the total voltage of the battery pack appears on the two points of the broken contact. Since the circuits only operate on low voltage, they are immediately damaged if high voltage is fed to them. Thanks to the level shifter protective circuit, a substantial electronics destroying current cannot arise.

The generated heat of passive equalisation is preferably guided to the negative outlet of the battery, which is able to dissipate a significant heat volume. The heat generating unit is based on an FET (field effect transistor) design, which transfers the heat via the FET and through the copper carrier printed circuit board.

A package controller is the communication module of the cell package. It keeps contact with the outside world and it is connected in series with the first BMS module 116. The communication between the package controller and the outside world may also go through an optical cable which lends a higher safety to the system.

Depending on the type of the battery 118, the temperature of the battery may be measured even in the vicinity of the positive pole, by means of a thermometer 120 fitted in the circuit. This simplifies the production in addition to the fact that the heat appears on the outlets the soonest. The thermometer is fitted under the cover of the batteries 118.

The upLink/downLink communication is provided by way of example through a standard RS232 protocol. The uplink and the downlink provide communication between the cell controllers. In a normal case, the voltage of only one cell may appear on the capacities, e.g. 2.5V to 4.2V (Li-ion), but if the cell cabling is broken, then the voltage of the whole package may be present, and therefore the communication level shifter is preferably dimensioned for a 600V voltage.

The BMS is preferably switched by a FET switch 124.

The invention is, of course, not limited to the preferred embodiments described in details above, but further variants, modifications and developments are possible within the scope of protection determined by the claims. The control device according to the invention implements each step of the method by such units which can be implemented either in hardware or software form, and furthermore each unit can be implemented in combination or in several parts.

The invention claimed is:

1. A control method for determining components of a control voltage of an inverter adapted for feeding power to a grid, in course of which
    a vector direction of a voltage of the grid is determined,
    on a basis of active power and reactive power of the grid, current reference signal components are determined, and
    Park vector components are generated by Park transformation from current components associated with phase currents of the inverter,
    characterized by
    transforming the current reference signal components into transformed current reference signal components on a basis of a vector direction,
    generating a first error signal by leading a first component of the Park vector components and a first component of the transformed current reference signal components to a first subtracting unit, and generating a second error signal by leading a second component of the Park vector components and a second component of the transformed current reference signal to a second subtracting unit,
    guiding the first and the second error signals through control blocks each comprising three parallel signal paths and outputting summed up outputs of the three parallel signal paths, wherein out of the three parallel signal paths,
        in a first signal path, each of the first and the second error signals are guided through a proportional controller,
        in a second signal path, each of the first and the second error signals are guided through a first unit multiplying with a cosine of the vector direction, an integrator unit, and a second unit multiplying with a cosine of the vector direction, and
        in a third signal path, each of the first and the second error signals are guided through a first unit multiplying with a sine of the vector direction, an integrator unit, and a second unit multiplying with a sine of the vector direction, and
    determining the components of the control voltage on a basis of outputs of the control blocks by inverse Park transformation.

2. The method according to claim 1, characterized by carrying out current measurements on both sides of a transformer connected to the inverter, determining a magnetizing current and a second harmonic of the magnetizing current on a basis of the current measurements, averaging the magnetizing current multiplied with the second harmonic, determining a value of a DC component from a result of the averaging, and correcting the outputs of the control blocks or the current components obtained after feedback with the DC component.

3. A control device for determining components of a control voltage of an inverter adapted for feeding power to a grid, comprising a unit adapted for determining a vector direction of the grid voltage, a unit adapted for determining, on a basis of active power and reactive power of the grid, current reference signal components, and a unit adapted for generating Park vector components by Park transformation from components associated with phases of current of the inverter, characterized by further comprising a unit adapted for transforming the current reference signal components into transformed current reference signal components on a basis of a vector direction, a unit adapted for generating a first error signal by leading a first component of the Park vector components and a first component of the transformed current reference signal to a first subtracting unit, and for generating a second error signal by leading a second component of the Park vector components and a second component of the transformed current reference signal to a second subtracting unit, control blocks each comprising three signal paths and summarizing units connected to outputs of the three signal paths, wherein out of the three signal paths in a first signal path, each of the first and the second error signals are guided through a proportional controller, in a second signal path, each of the first and the second error signals are guided through a first unit multiplying with a cosine of the vector direction, an integrator unit and a second unit multiplying with the cosine of the vector direction, and in a third signal path, each of the first and the second error signals are guided through a first unit multiplying with a sine of the vector direction, an integrator unit, and a second unit multiplying with the sine of the vector direction, and a unit adapted for determining the components of the control voltage by inverse Park transformation on a basis of the outputs of the control blocks.

4. The control device according to claim 3, characterized by comprising a unit adapted for performing current measurements on both sides of a transformer connected to the inverter, a unit adapted for determining a magnetizing current and a second harmonic of the magnetizing current on a basis of the current measurements, a unit adapted for averaging the magnetizing current multiplied with the second harmonic of the magnetizing current, a unit adapted for determining value of a DC component from a result of averaging, and a unit adapted for correcting the outputs of the control blocks or the current components obtained after feedback with the DC component.

5. A mobile electric power storage apparatus, characterized by comprising the control device according to claim 3.

* * * * *